US009854601B2

(12) United States Patent
Rajaee et al.

(10) Patent No.: US 9,854,601 B2
(45) Date of Patent: Dec. 26, 2017

(54) DELIBERATING RETRANSMISSIONS TO AVOID NEW HYBRID AUTOMATIC REPEAT REQUESTS (HARQ)

(71) Applicant: QUALCOMM INCORPORATED, San Diego, CA (US)

(72) Inventors: Amir Rajaee, San Diego, CA (US); Chintan Shirish Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 14/959,654

(22) Filed: Dec. 4, 2015

(65) Prior Publication Data

US 2017/0164398 A1   Jun. 8, 2017

(51) Int. Cl.
| | | |
|---|---|---|
| *H04W 88/06* | (2009.01) | |
| *H04W 72/12* | (2009.01) | |
| *H04W 60/00* | (2009.01) | |
| *H04W 36/14* | (2009.01) | |
| *H04W 28/02* | (2009.01) | |
| *H04W 72/04* | (2009.01) | |

(52) U.S. Cl.
CPC ....... *H04W 72/1284* (2013.01); *H04W 28/02* (2013.01); *H04W 36/14* (2013.01); *H04W 60/005* (2013.01); *H04W 72/1215* (2013.01); *H04W 88/06* (2013.01)

(58) Field of Classification Search
CPC ... H04L 1/1854; H04L 5/0055; H04L 1/0003; H04W 76/026; H04W 88/06
USPC ................................................. 370/329, 252
See application file for complete search history.

(56) References Cited

U.S. PATENT DOCUMENTS

| | | | |
|---|---|---|---|
| 8,064,405 B2 | 11/2011 | Parekh et al. | |
| 8,761,788 B2 | 6/2014 | Rajurkar et al. | |
| 8,824,411 B2 | 9/2014 | Sebeni et al. | |
| 9,179,395 B2 * | 11/2015 | Ji | H04W 48/16 |
| 2013/0235843 A1 | 9/2013 | Gohari et al. | |
| 2013/0244590 A1 * | 9/2013 | Nukala | H04W 80/06 455/77 |

(Continued)

FOREIGN PATENT DOCUMENTS

WO   2011088468 A1   7/2011

OTHER PUBLICATIONS

International Search Report and Written Opinion—PCT/US2016/064360—ISA/EPO—dated Feb. 20, 2017.

*Primary Examiner* — Charles G Jiang
*Assistant Examiner* — Will Lin
(74) *Attorney, Agent, or Firm* — Foley & Lardner LLP (57) ABSTRACT

A method, device and system provide improved throughput for network subscriptions in multi-SIM, multi-standby wireless devices by triggering false or fake NAK/Tx messages prior to the tune-away. The technique includes receiving and decoding communications from a node at a user equipment during a first subscription communication mode; in response to a communication from the node to the user equipment after a certain time period prior to a tune away period in which the user equipment communicates in a second subscription communication mode, communicating a fake NACK message from the user equipment to the node; and after the tune away period ends, receiving communications at the user equipment from the node and responding with an ACK message.

14 Claims, 6 Drawing Sheets

(56) References Cited

U.S. PATENT DOCUMENTS

2013/0303181 A1\* 11/2013 Rajurkar ........... H04W 72/0453
  455/452.1
2015/0099528 A1   4/2015 Hu et al.
2015/0295691 A1\* 10/2015 Khazaei ................ H04L 1/1854
  370/329

\* cited by examiner

DELIBERATING RETRANSMISSIONS TO AVOID NEW HYBRID AUTOMATIC REPEAT REQUESTS (HARQ)

BACKGROUND

Aspects of the present disclosure relate generally to wireless communication systems, and more particularly, to tune away in multi-SIM devices.

A wireless communication device, such as a mobile phone device or a smart phone, may include at least one Subscriber Identity Module (SIM). Each SIM may enable one or more subscriptions. Each subscription may correspond to a Radio Access Technology (RAT). Specifically, with respect to multi-SIM wireless communication devices, when all SIMs are active, the wireless communication device may be a Multi-SIM-Multi-Active (MSMA) device. On the other hand, when one SIM is active while the rest of the SIM(s) is/are standing by, the wireless communication device may be a Multi-SIM-Multi-Standby (MSMS) device. With Dual Sim, Dual Standby (DSDS) or Multi-SIM-Multi-Standby (MSMS) devices only one SIM is active because there is only one RF chain which is shared by the SIMs. The RATs may include, but are not limited to, Frequency Division Multiple Access (FDMA), Time Division Multiple Access (TDMA), Global System for Mobile Communications (GSM), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), Single Radio LTE (SRLTE), Simultaneous GSM and LTE (SGLTE), High-Speed Downlink Packet Access (HSDPA), and the like), Code Division Multiple Access 1× Radio Transmission Technology (1×), General Packet Radio Service (GPRS), Wi-Fi, Personal Communications Service (PCS), and other protocols that may be used in a wireless communications network or a data communications network.

Some wireless devices are configured to facilitate communication on two separate networks via two separate subscriptions. For instance, dual-subscriber identity module (SIM), dual standby (DSDS) devices may include two SIM cards—one card for a first subscription and a second card for a second subscription. Furthermore, each subscription may be associated with one or more technology types. For example, a first subscription may exclusively support 2G communication technology, such as Global System for Mobile Communications (GSM), while the second subscription may support one or more 3G communication technologies (e.g., Wideband Code Division Multiple Access (WCDMA)) and 2G communication technology.

In DSDS devices, a user may establish a call, such as a voice call, data call, data session, text messaging session, or any other data transfer session, via one of the two subscriptions. Because most DSDS devices contain a single radio resource, such as a transceiver, where a first subscription has established an ongoing call with a first subscription network, the UE tunes the transceiver away to the second subscription to receive paging signals and to transmit, for example, message acknowledgement signals and/or measurement indication signals. Therefore, while the first subscription continues an ongoing call, the transceiver may periodically tune away from the first subscription to the second subscription to receive such necessary paging and/or control information.

Therefore, in DSDS devices, a user may engage in a data call via a first subscription, but must intermittently halt the data session to tune away to receive control data associated with the second subscription, which is typically in idle mode. This tune away may lead to reduction in data throughput on the first subscription for its ongoing data call, as no data transfer takes place relative to the data call while the device tunes away to the second subscription which is then using radio resources such as the transceiver. What is more, the second subscription may hold the radio resources for a long period of time in order to complete software processing related to base station registration, which exacerbates the reduced data throughput problem on the first subscription. Tune away cannot be avoided completely, however, as the second subscription must periodically receive control data from its network, such as paging messages and the like.

Thus, methods and apparatuses are used to allow for increased performance on the first technology as it continues an active data session while allowing the second subscription to tune away to receive essential messages.

SUMMARY

Aspects of the present disclosure generally provide methods and apparatuses for improved throughput for network subscriptions in multi-SIM, multi-standby wireless devices by triggering false or "fake" NACK/Tx messages prior to the tune-away (TA). By sending false NACK/Tx messages prior to TA, the eNB is kept busy with retransmissions due to not receiving a DL/UL grant, regardless of scheduling rate. Recovery happens after the TA in the first set of retransmissions after TA. In an example implementation, the user equipment (UE) measures the scheduling rate for 100 ms prior to TA and if it's less than 50% (low scheduling rate), the UE sends false NACK/Tx messages starting from 6 ms prior to the tune away start subframe. The false NACK/Tx messages result in the eNB retransmitting messages already received by the UE during the TA. After the TA, the UE can send an ACK on the retransmissions because it already received and decoded the messages. If the scheduling rate is higher than 50% (high scheduling rate), it does its normal operation prior to tune away and no fake NACK messages are sent.

In a further aspect, the present disclosure provides for a method of managing a wireless communication device having a first subscription and a second subscription. The method includes receiving and decoding communications from a node at a user equipment during a first subscription communication mode; in response to a communication from the node to the user equipment after a certain time period prior to a tune away period in which the user equipment communicates in a second subscription communication mode, communicating a fake NACK message from the user equipment to the node; and after the tune away period ends, receiving communications at the user equipment from the node and responding with an ACK message.

Furthermore, the present disclosure provides for a wireless device including at least one radio frequency (RF) resource and a processor coupled to the at least one RF resource and configured to connect to a first Subscriber Identity Module (SIM) associated with a first subscription and to a second SIM associated with a second subscription. The processor is configured with processor-executable instructions to receive communications from a node during a first communication mode associated with the first subscription; communicate a fake NACK message to the node in response to communications from the node received after a certain time period prior to a tune away period for a second communication mode associated with the second subscription; and receive communications from the node after the tune away period and respond with an ACK message.

In addition, the present disclosure provides for a communication system in which a first device is configured to selectively operate in a first subscription mode and a second subscription mode. The communication system includes a single-mode communication node configured to communicate in a first subscription mode and a dual-mode communication device configured to receive communications from the single-mode communication node while in the first subscription mode. The dual-mode communication device is configured to: communicate a fake NACK message to the single-mode communication node in response to a communication received in a time period immediately preceding a tune away period in which the dual-mode communication device operates in a second subscription mode; and respond to a communication received from the single-mode communication node after the tune-away period ends with an ACK message.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

The present disclosure presents methods and apparatuses for improved tune away in DSDS devices. Specifically, the present disclosure provides methods and apparatus for reducing potential delay in communication resulting from tune away by triggering fake NAK/Tx communications prior to the tune away period. By scheduling the fake NAK/Tx communications, the eNB retransmits data that it thinks was not received because of the fake NAK/Tx communication. The eNB receives a positive ACK after the tune away and when the retransmitted communications are received again.

Generally, embodiments described herein may be applicable to an LTE wireless communication device in which out of two or more subscriptions, one subscription may be tuned into or active at a given time. Particularly, embodiments may related to a wireless communication device in which two or more subscriptions share a same Radio Frequency (RF) resource (RF resource sharing) and tune-aways are utilized to communicate with the subscriptions in a sequential manner, one at a time. Examples of combinations of subscriptions include, but are not limited to, LTE-and-1×, LTE-and-GSM, SRLTE-and-GSM, SGLTE-and-GSM, or the like.

Additionally, embodiments may likewise be applicable to wireless communication devices that disable communication activities of a first subscription due to interference with a second subscription when the first and second subscriptions utilize separate RF resources (in MSMA devices). In such cases, instead of tuning away to the second subscription, the RF resource associated with the first subscription may be disabled or blanked during communication activities of the second subscription. Thus, a period of time in which the RF resource associated with the first subscription is disabled (a disabled time interval) may correspond to a tune-away time interval relating to the MSMS scenarios as described herein.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services, subscriptions, and RATs supported by that network, correlate to one another.

Figure 1:
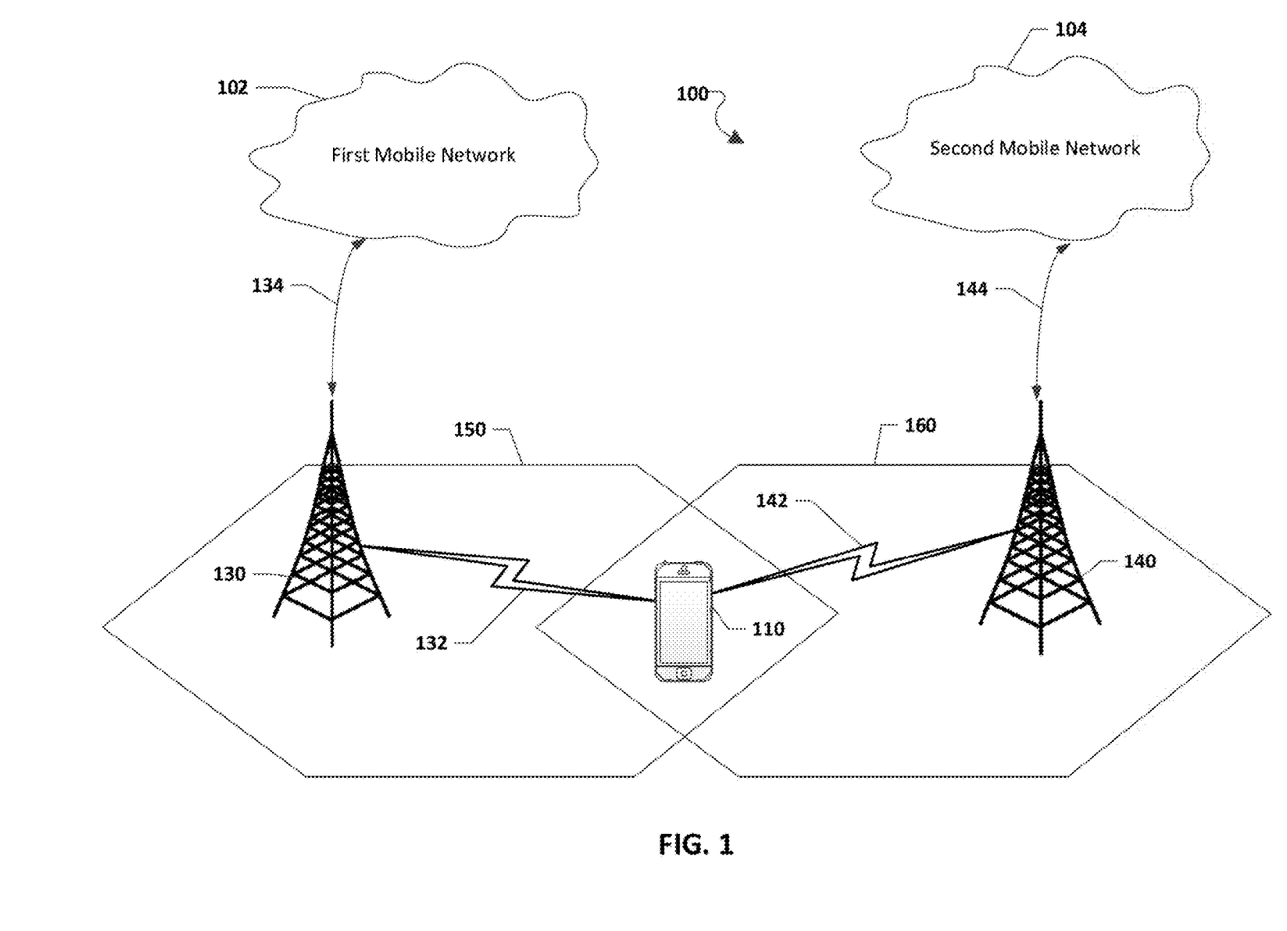
FIG. 1 is a schematic diagram illustrating an example of a communication system in which scheduling request throttling can be implemented in accordance with various embodiments.

Various embodiments may be implemented within a communication system 100, an example of which is illustrated in FIG. 1. Referring to FIG. 1, a first mobile network 102 and a second mobile network 104 may each associate with a plurality of cellular base stations (e.g., a first base station 130 and a second base station 140). The first base station 130 may broadcast the first mobile network 102 in a first serving cell 150. The second base station 140 may broadcast the second mobile network 104 in a second serving cell 160. A wireless communication device 110 may be associated with both the first serving cell 150 and the second serving cell 160.

The wireless communication device 110 may be in communication with the first mobile network 102 through a first cellular connection 132 to the first base station 130. The first cellular connection 132 may correspond to the first subscription of the wireless communication device 110. The wireless communication device 110 may also be in communication with the second mobile network 104 through a second cellular connection 142 to the second base station 140. The second cellular connection 142 may correspond to the second subscription of the wireless communication device 110, as in a multi-SIM context. The first base station 130 may be in communication with the first mobile network 102 over a wired or wireless connection 134. The second base station 140 may be in communication with the second mobile network 104 over a wired or wireless connection 144.

The first cellular connection 132 and the second cellular connection 142 may be made through two-way wireless communication links. Each of the wireless communication links may be enabled by any suitable protocol including, but not limited to, FDMA, TDMA, CDMA (e.g., 1×, EV-DO), UMTS (e.g., WCDMA, LTE, SRLTE, SGLTE, HSDPA, or the like), GSM (e.g., GPRS, EDGE), Wi-Fi, PCS, and/or another protocol used in a wireless communications network or a data communications network. By way of illustrating with a non-limiting example, the first cellular connection 132 may be a LTE, SRLTE, or SGLTE connection/subscription. The second cellular connection 142 may be a 1× or GSM connection/subscription. Other subscriptions (such as, but not limited to, WCDMA, HSDPA, EVDO, and the like) may be implemented in a similar manner.

Each of the first base station 130 and the second base station 140 may include at least one antenna group or transmission station located in the same or different areas. The at least one antenna group or transmission station may be tasked with signal transmission and reception. Each of the first base station 130 and the second base station 140 may include one or more processors, modulators, multiplexers, demodulators, demultiplexers, antennas, and the like for performing the functions of the base station. In some embodiments, each of the first base station 130 and the second base station 140 may be an access point, Node B, evolved Node B (eNodeB or eNB), Base Transceiver Station (BTS), or the like.

In various embodiments, the wireless communication device 110 may be configured to access the first mobile network 102 and the second mobile network 104 by virtue of the multi-SIM and/or the multi-mode SIM configuration of the wireless communication device 110 (e.g., via the first cellular connection 132 and the second cellular connection 142). When a SIM corresponding to a subscription is inserted, the wireless communication device 110 may access the mobile communication network associated with that subscription or RAT based on the information stored on the SIM.

While the wireless communication device 110 is shown connected to the mobile networks 102 and 104 via two cellular connections, in other embodiments (not shown), the wireless communication device 110 may establish additional network connections using at least one additional available subscription.

In some embodiments, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some embodiments, the wireless communication device 110 may establish a wireless connection with a wireless access point (not shown), such as over a Wi-Fi connection. The wireless access point may be configured to connect to the Internet or another network over a wired connection.

Figure 2:
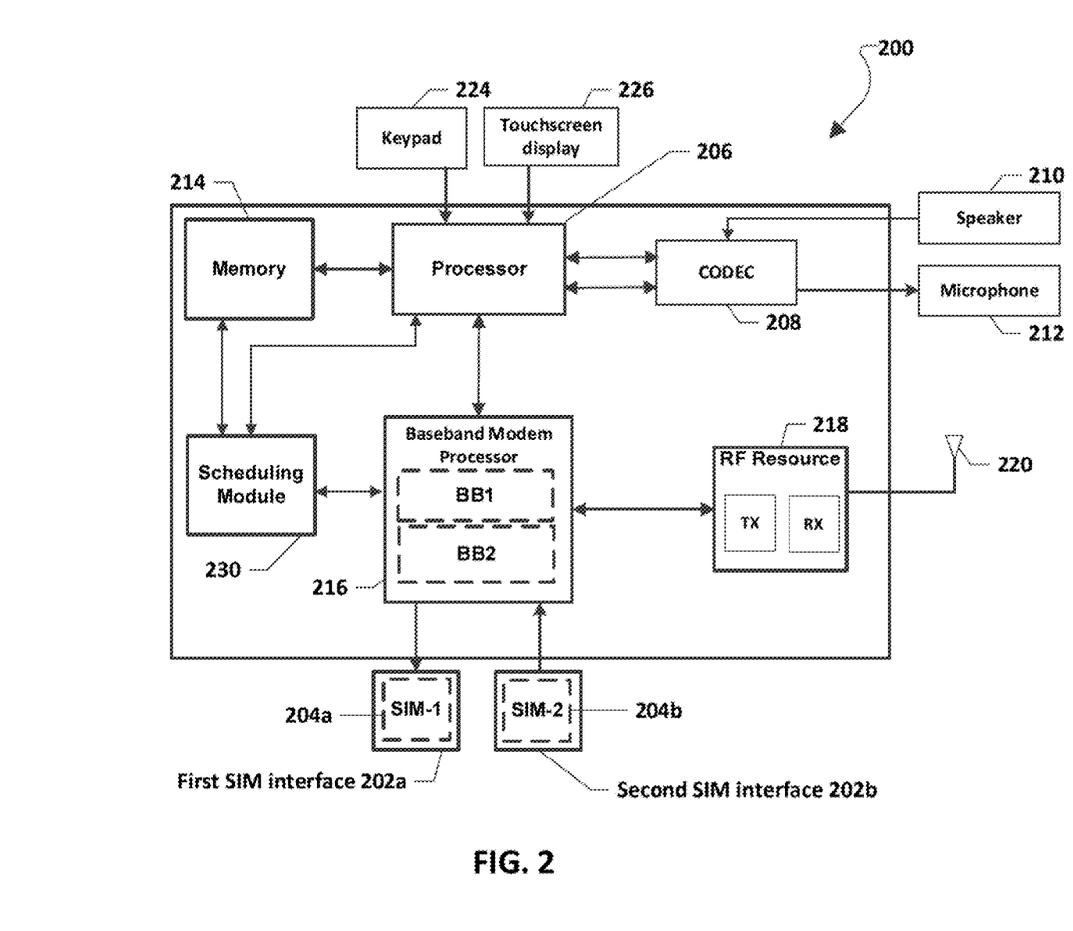
FIG. 2 is a component block diagram illustrating an example of a wireless communication device in which the scheduling request throttling can be implemented according to various embodiments.

FIG. 2 is a component block diagram illustrating an example of a wireless communication device 200 in which the scheduling request throttling can be implemented according to various embodiments. According to various embodiments, the wireless communication device 200 may be an example of the wireless communication device 110 as described with reference to FIG. 1. Referring to FIGS. 1-2, the wireless communication device 200 may include a first SIM interface 202a, which may receive a first identity module SIM-1 204a that is associated with the first subscription. The wireless communication device 200 may also include a second SIM interface 202b, which may receive a second identity module SIM-2 204b that is associated with the second subscription.

A SIM in various embodiments may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various embodiments may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 200 may include at least one controller, such as a processor 206, which may be coupled to a coder/decoder (CODEC) 208. The CODEC 208 may in turn be coupled to a speaker 210 and a microphone 212. The processor 206 may also be coupled to at least one memory 214. The processor 206 may include any suitable data processing device, such as a microprocessor. In the alternative, the processor 206 may be any suitable electronic processor, controller, microcontroller, or state machine. The processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions executable by the processor 206. For example, the instructions may include routing communication data relating to the first or second subscription though a corresponding baseband-RF resource chain (including RF resource 218). The memory 214 may include any suitable internal or external device for storing software and data.

Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The processor 206 and the memory 214 may each be coupled to baseband modem processor 216. The SIMs in the wireless communication device 200 (e.g., the SIM-1 204a and/or the SIM-2 204b) may be associated with at least one baseband-RF resource chain. A baseband-RF resource chain may include the baseband modem processor 216, which may perform baseband/modem functions for communications on at least one SIM. The baseband modem processor 216 may include one or more amplifiers and radios, referred to generally herein as RF resource 218 or a RF chain.

The embodiments described herein may be applicable to wireless communication devices in which the first and second subscriptions share RF resource (particularly, the RF resource 218). Embodiments described herein may also be applicable to wireless communication devices in which the first and second subscriptions each has separate RF resource, but activities of the second subscription may nevertheless de-sense (e.g., interfere with) the first subscription so as to justify blanking or power back-off that prevent the second subscription from transmitting or receiving when the first subscription is communicating.

The RF resource 218 may include at least one transceiver that perform transmit/receive functions for the associated SIMs 204a, 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some embodiments, the processor 206, the memory 214, the baseband modem processor 216, and the RF resource 218 may be included in the wireless communication device 200 as a system-on-chip. In some embodiments, the SIMs 202a, 202b and their corresponding interfaces 204a, 204b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication therebetween.

The wireless communication device 200 may include a scheduling module 230 configured to manage and/or schedule activities of the first and the second subscriptions on the RF resource 218 and the baseband modem processor 216. For example, the scheduling module 230 may be configured perform one or more processes described herein with respect to scheduling tune-aways to the second subscription, determining a length of the tune-away, determining the maximum count for sending the scheduling requests, transmitting the scheduling requests, initiating the uplink data RACH process, and the like.

In some embodiments, the scheduling module 230 may be implemented with the processor 206. For example, the scheduling module 230 may be implemented as a software application stored within the memory 214 and executed by the processor 206. Accordingly, such embodiments can be implemented with minimal additional hardware costs. However, other embodiments relate to systems and processes implemented with dedicated hardware specifically configured for performing operations described herein with respect to the scheduling module 230. For example, the scheduling module 230 may be implemented as a separate processing component (i.e., separate from the processor 206). The scheduling module 230 may be coupled to the memory 214, the processor 206, the baseband processor 216, and/or the RF resource 218 for performing the functions described herein.

Hardware and/or software for the functions may be incorporated in the wireless communication device 200 during manufacturing, for example, as a part of a configuration of an original equipment manufacturer (OEM) of the wireless communication device 200. In further embodiments, such hardware and/or software may be added to the wireless communication device 200 post-manufacture, such as by installing one or more hardware devices and/or software applications onto the wireless communication device 200.

In embodiments not shown in the FIGS., the wireless communication device 200 may include, among other things, additional SIMs, SIM interfaces, at least another RF resource associated with the additional SIMs, and additional antennas for connecting to additional mobile networks.

Figure 3:
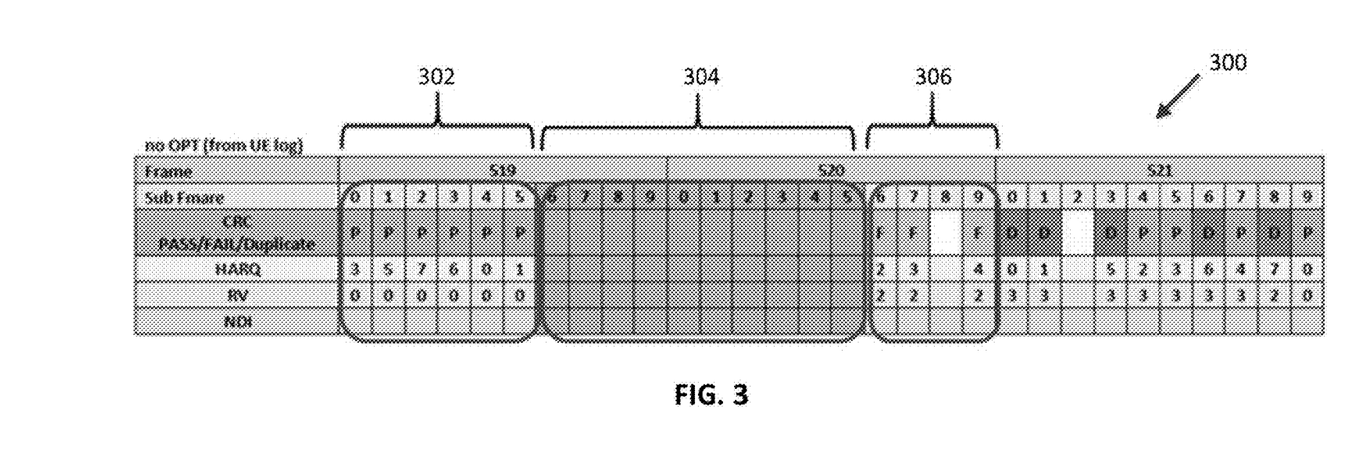
FIG. 3 is a chart depicting communication frames in a wireless communication system including cyclic redundancy check (CRC) codes, hybrid automatic repeat request (HARQ) codes, and redundancy version (RV) codes in each sub-frame in accordance with a non-optimized technique.

FIG. 3 illustrates a chart 300 depicting communication frames received by a UE in a wireless communication system including cyclic redundancy check (CRC) codes, hybrid automatic repeat request (HARQ) codes, and redundancy version (RV) codes in each sub-frame in accordance with a non-optimized technique. In the non-optimized technique, the DSDS solution for LTE tunes away to the second subscription (e.g., GSM, WCDMA) for a few milliseconds (~10 to 35 ms depending on the status of the second subscription).

As shown in the chart 300 in FIG. 3, the UE receives and decodes all transmissions from an eNB in frame 519, sub-frames 0 to 5. However, starting in sub-frame 6, the downlink grants from the eNB are sent but the UE never receives them because the UE is in tune away, operating in a different subscription than that provided by the eNB. After the tune away ends in frame 520, sub-frame 6 (which is a total of 10 sub-frames of tune away), the UE fails to decode the retransmissions from the eNB due to poor channel conditions (e.g., fading). After a number of failed transmission attempts (as indicated by "F" in subframes 6-9 of frame 520), the UE begins to send ACK communications back to the eNB when the communication passes ("P") in frame 521.

Figure 4:
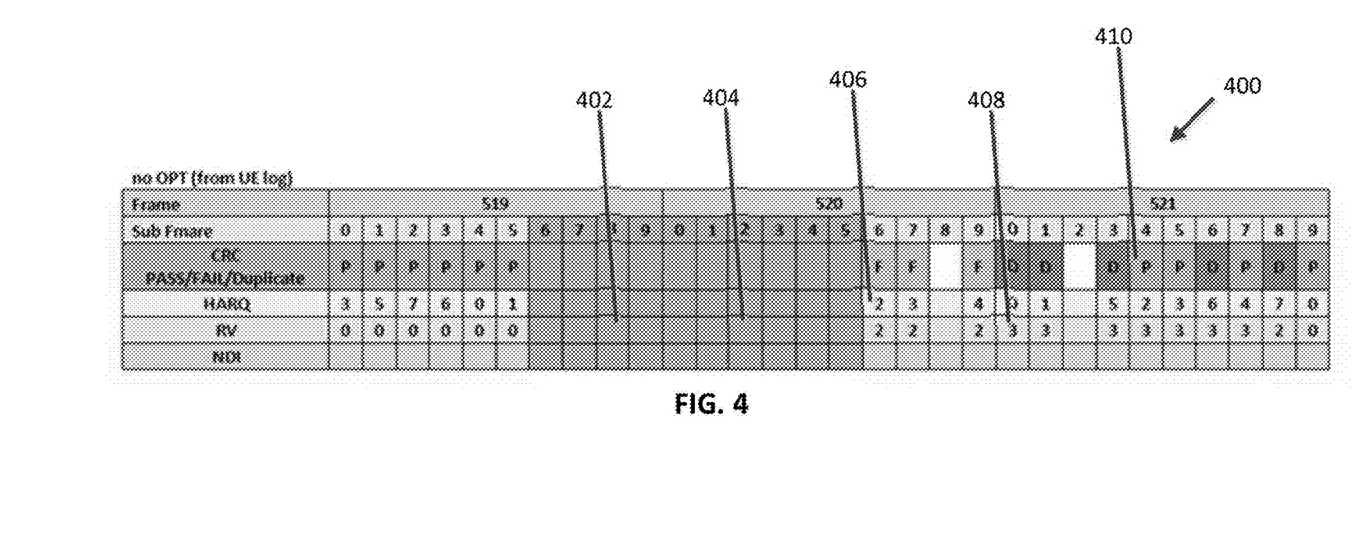
FIG. 4 is a chart depicting communication frames in a wireless communication system including CRC codes, HARQ codes, and RV codes in each sub-frame in accordance with a non-optimized technique.

FIG. 4 provides a chart 400 with additional detail in the communication sequence depicted in the chart 300 of the UE communication log in FIG. 3. As shown in chart 400, during the tune away period, in frame 519, sub-frame 8, at point 402 the eNB transmits HARQ2 (RVO) as a new grant but the UE does not receive it because it is in tune away. The eNB expects to receive an ACK or NACK 4 ms later in frame 520, sub-frame 2, at point 404, but the UE never sends it because it was not listening to the LTE channel. In frame 520, sub-frame 6, at point 406 the eNB retransmits HARQ2 (RV2) but the UE fails to receive it because the UE and eNB are out of sync. The UE sends a NACK 4 ms later in frame 521, sub-frame 0, at point 408 because it was out of sync at frame 520, sub-frame 6, at point 406. Then, 4 ms later, in frame 521, sub-frame 4, at point 410 the eNB sends the next retransmission (RV3) for HARQ2 and the UE will fail if the UE is in poor channel performance. If there is good channel performance, the UE receives the transmission and sends the eNB back an ACK 4 ms later.

The communication logs depicted in charts 300 and 400 demonstrate the effects of the tune away time period on communications between the UE and the eNB. The adverse effects of the tune away are exacerbated when the signal strength is poor and communications are not properly received after tune away is over and the UE and eNB are attempting to synchronize. Scenarios in which the above example worked were mostly poor RF conditions with low scheduling rate\MCS or when recovery after tuneaway is slow.

Figure 5:
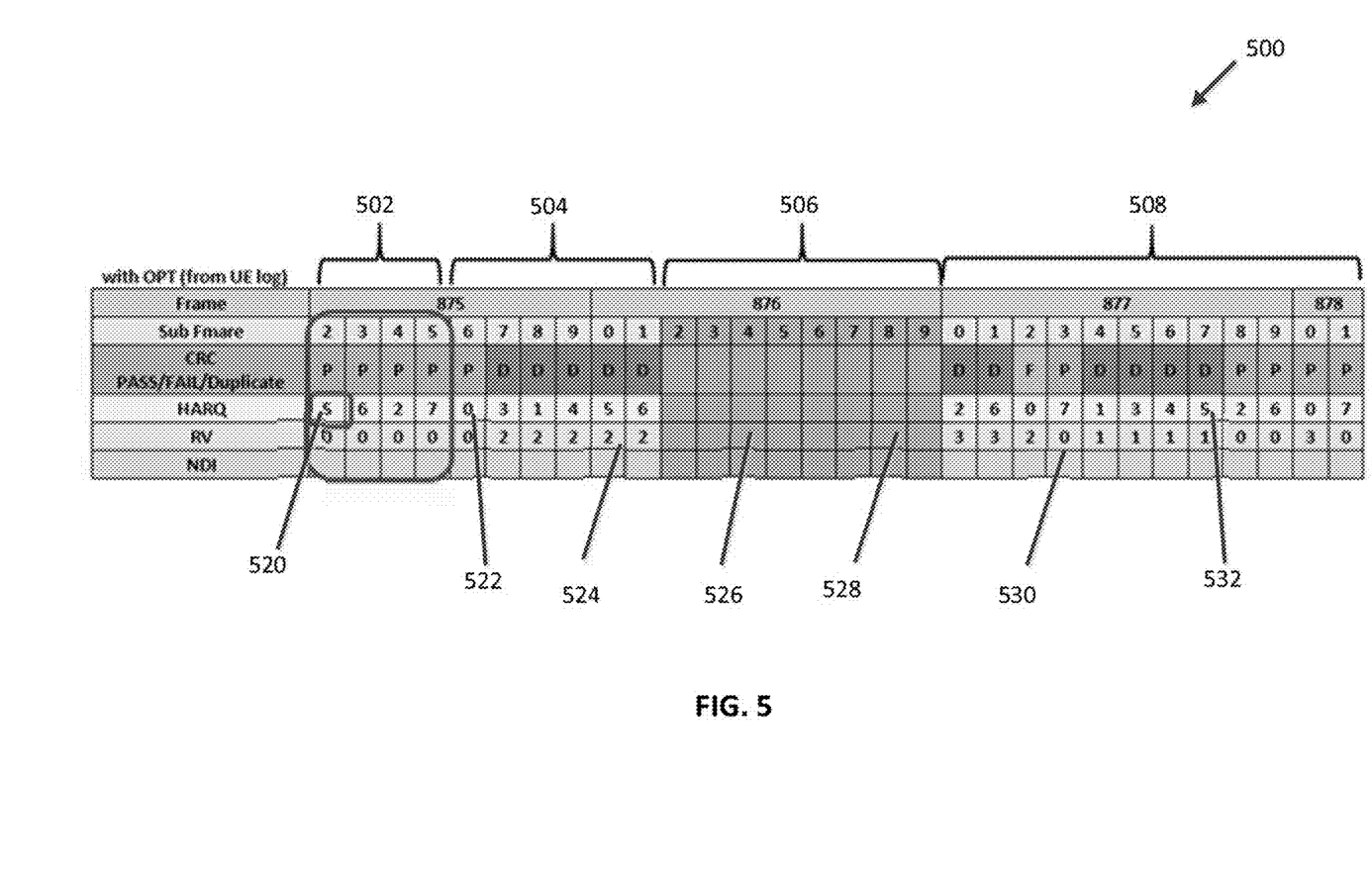
FIG. 5 is a chart depicting communication frames in a wireless communication system including CRC codes, HARQ codes, and RV codes in each sub-frame in accordance with an optimized technique in accordance with an exemplary embodiment.

FIG. 5 illustrates a chart 500 that depicts communication frames in a wireless communication system having a node (eNB) and a user equipment (UE). The communication frames include CRC codes, HARQ codes, and RV codes in each sub-frame in accordance with an optimized technique in accordance with an exemplary embodiment. In general, the chart 500 demonstrates advantages to an optimized technique. Chart 500 provides a depiction of a UE log with various sections of sub-frames over time during communication between node eNB and UE. Section 502 are sub-frames where signals from the eNB are properly decoded at the UE. For example, at point 520 in the communication, sub-frame 2 shows an HARQ of 5 is received by the UE from the eNB.

In an exemplary embodiment, section 504 starts approximately 6 ms before a tune away period where the UE communicates using a different communication protocol, such as GSM. During section 504, the eNB does not see good UE performance because the UE sends false or "fake" NACK signals in response to the communications from eNB. The signals are false or "fake" NACK signals because the UE does receive the communications from the eNB but it responds to the eNB as if it has not which keeps the tuneaway busy with retransmissions in order to not receive new UL or DL grants. Sending UL and DL grants in tuneaway may result mismatches between the UE and eNB after tuneaway. For example, a missed DL or UL grant in tuneaway may cause failures after tuneaway is over. In section 504, 4 ms after sub-frame 2 (HARQ 5), at point 522 the UE sends a NACK for HARQ5 (received on frame 875-2). At point 524, the eNB retransmits again and the UE passes the duplicate data because the UE already decoded it at 875-2 even though it had responded with a NACK.

Section 506 are sub-frames in a tune away period in which eNB retransmits communication signals the eNB does not believe the UE received but the eNB does not see good UE performance because the UE is tuned away to a different communication protocol. For instance, at point 526 the eNB receives no NACK/ACK from the UE for HARQ5 because the UE is not listening. At point 528, 4 ms after point 526, the eNB retransmits the same communication.

Section 508 are sub-frames where the eNB retransmits and the UE passes all of the signals because the UE received the data in section 504 but sent a false NACK. The UE sends an ACK during section 508 regardless of whether the channel signal is good or poor because the UE already decoded the signal in section 504. For instance, at point 526 the eNB expects to receive NACK/ACK from the UE but nothing arrives because the UE was in tune away. However, at point 532 the eNB retransmits the HARQ5 and the UE sends an ACK signal 4 ms later. As such, the synching back of communication between the UE and eNB after tune away happens in a relatively consistent manner because the retransmitted messages after the tune away period are acknowledged as received regardless of the channel quality because the UE already processed the communications during the pre-tuning away period when the UE sent fake NACK signals.

Figure 6:
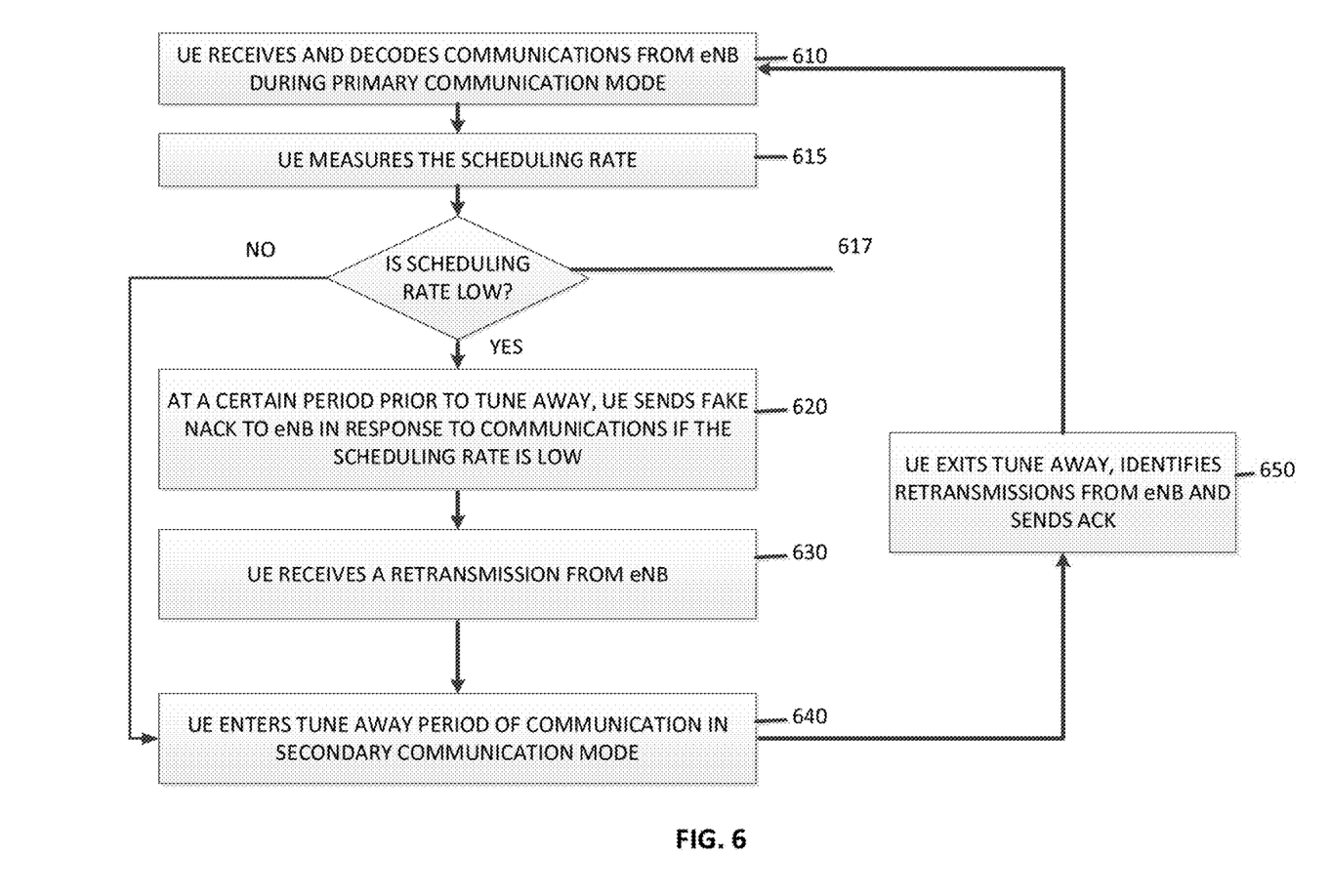
FIG. 6 is a flow diagram depicting operations performed in the optimized technique of deliberating retransmissions in accordance with an exemplary embodiment.

FIG. 6 is a flow diagram depicting operations performed in the optimized technique of deliberating retransmissions in accordance with an exemplary embodiment. Additional, fewer, or different operations may be performed, depending on the particular embodiment. In an exemplary embodiment, an operation 610 is performed in which the user equipment (UE) receives and decodes communications from a network node (eNB) during a primary communication mode, such as LTE. The primary communication mode may be another Radio Access Technology (RAT). At an operation 615, the UE measures the scheduling rate prior to tune away. In one example, it is measured for 100 msec, but it can be longer or shorter in other examples. In an operation 617, the UE determines is the scheduling rate is low? In an operation 620, at a certain period prior to the UE tuning away from the primary communication mode to a secondary communication mode, the UE responds to communications from eNB by sending fake NACK messages to the eNB even though the UE properly receives and decodes the communications from the eNB if the scheduling rate is low. In one example, the period prior to the tuning away is >6 ms. If scheduling rate is not low, UE goes to operation 640.

Depending on scheduling rate and channel condition, failure recovery post tuneaway will vary. In one example, if the UE determines the scheduling rate of communications with the eNB is less than 50% (low scheduling rate), then fake NACK messages are sent prior to the tune away. The reason fake NACK messages are sent is that in poor channel conditions (low scheduling rate/MCS causing slow recovery after tuneaway), one missed UL grant may cause duplicate packets for long time periods which may result in high penalties from the NW. This situation can be worse in TDD NW's depending on TDD configuration. However, if the scheduling rate is higher than 50% (high scheduling rate), the fake NACK messages are not sent and the user equipment performs normal operations prior to the tune away, because with high scheduling rates, the UE quickly recovers the missed UL or DL grants after tuneaway. Thus, sending fake NACK messages would hurt scheduling performance with high scheduling rate/MCS. Thus, the present method and apparatus does not sending fake NACk messages when channel conditions are good. In alternative examples, the scheduling rate threshold may be lower or higher than 50%. If the network has DTX detection, less post tuneaway failures occur. With DTX detection, the NW sends the same RV (same amount of data) post tuneaway in the case where an ACK/NACK was not received from the UE in tuneaway.

In an operation 630, the UE receives another communication from eNB which is a retransmission of data already sent because eNB received the fake NACK in return. The UE passes the duplicate data without decoding because it already received and decoded the data earlier. In an operation 640, the UE enters a tune away period of a secondary communication mode, such as GSM. The secondary communication mode may be another Radio Access Technology (RAT). During tune away, the eNB does not receive any ACK or NACK messages from the UE.

In an operation 650, the UE exits tune away, returns to the primary communication mode, and identifies data from eNB received prior to the tuning away period when the UE sent fake NACK messages to the eNB. The UE does not need to decode the retransmission because it already did. However, the UE now sends an ACK to eNB to acknowledge receipt of the communication. The ACK is communicated even with poor channel quality because the communication was already previously decoded. Communications continue between the UE and the eNB until another tune away period approaches in operation.

Testing of the processes described with reference to FIGS. 5 and 6 show that by sending false or "fake" NACK prior to the tune away such that the eNB is busy with retransmissions during the tune away period, recovery happens after the tune away in the first set of retransmissions regardless of the scheduling rate. In an example implementation, the UE measures the scheduling rate for 100 ms prior to the tune away and, if it's less than 50%, the UE sends fake NAK/Tx messages starting from 6 ms prior to the subframe start of the tune away period. If the scheduling rate is higher than 50%, the UE can perform its normal operation prior to tune away. Thus, the present method and apparatus does not send fake NACk messages when channel conditions are good. The degradation caused by sending fake NAK/Tx messages starting from 6 ms prior to the subframe start of the tune away period is removed.

Figure 7:
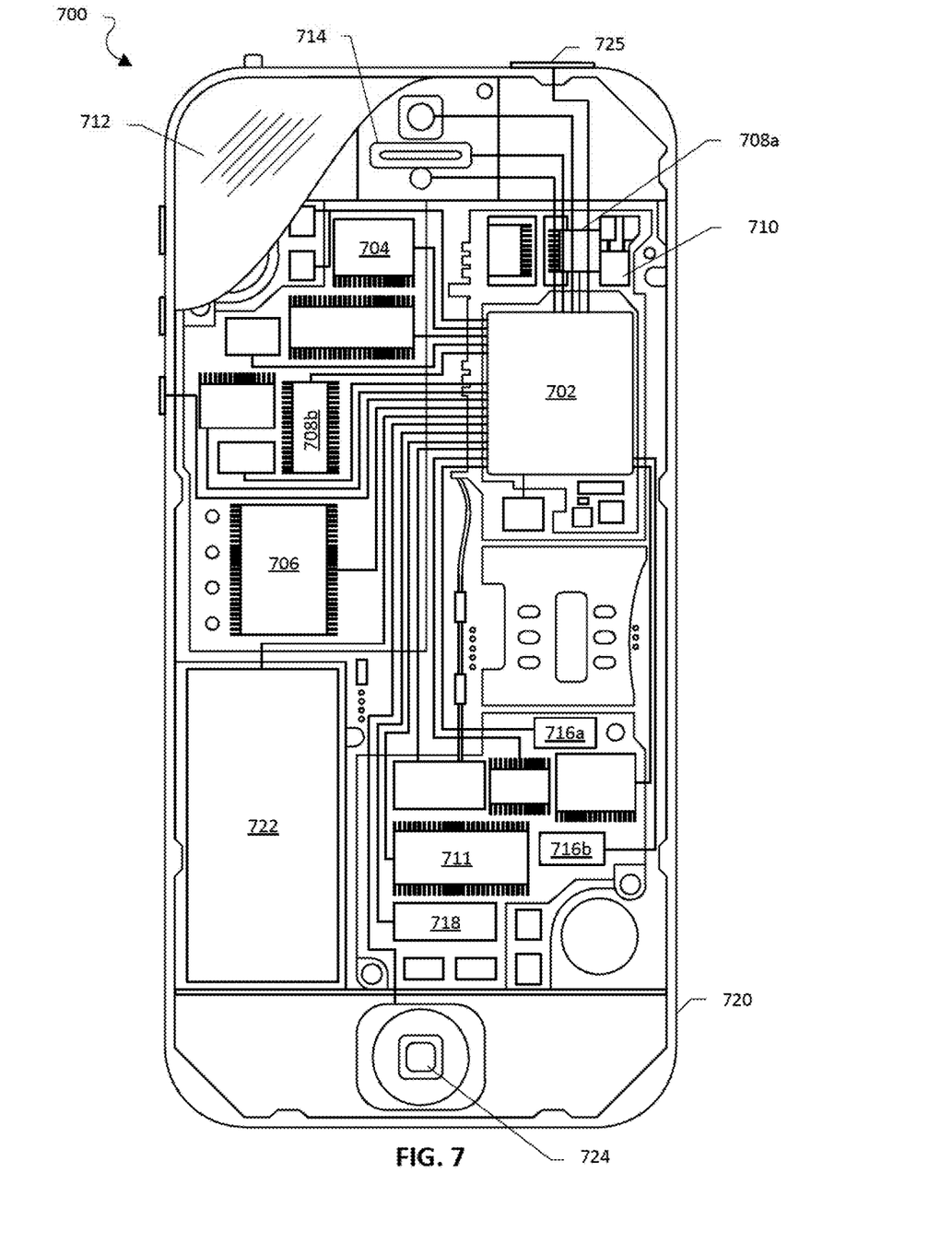
FIG. 7 is a component block diagram of a wireless communication device suitable for use with various embodiments of the deliberating retransmissions technique in accordance with an exemplary embodiment

The various embodiments may be implemented in any of a variety of wireless communication device 200, an example of which is illustrated in FIG. 7, as wireless communication device 700. As such, the wireless communication device 700 may implement the process and/or the apparatus of FIGS. 1-6B, as described herein.

With reference to FIGS. 1-7, the wireless communication device 700 may include a processor 702 coupled to a touchscreen controller 704 and an internal memory 706. The processor 702 may be one or more multi-core integrated circuits designated for general or specific processing tasks. The memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless communication device 700 need not have touch screen capability.

The wireless communication device 700 may have one or more cellular network transceivers 708a, 708b coupled to the processor 702 and to at least one antenna 710 and configured for sending and receiving cellular communications. The transceivers 708a, 708b and antenna 710 may be used with the above-mentioned circuitry to implement the various embodiment methods. The cellular network transceivers 708a, 708b may be the RF resource 218. The antenna 710 may be the antenna 220. The wireless communication device 700 may include two or more SIM cards 716a, 716b, corresponding to SIM-1 204a and SIM-2 204b, coupled to the transceivers 708a, 708b and/or the processor 702. The wireless communication device 700 may include a cellular network wireless modem chip 711 (e.g., the baseband modem processor 216) that enables communication via at least one cellular network and is coupled to the processor 702.

The wireless communication device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown).

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to a peripheral device connection port (not shown) to receive a charging current from a source external to the wireless communication device 700. The wireless communication device 700 may also include a physical button 724 for receiving user inputs. The wireless communication device 700 may also include a power button 725 for turning the wireless communication device 700 on and off.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing a wireless communication device having a first subscription and a second subscription, the method comprising:
   receiving communications from a node at a user equipment during a first subscription communication mode;
   determining a scheduling rate for communications between the user equipment and the node;
   in response to a communication from the node to the user equipment after a certain time period prior to a tune away period in which the user equipment communicates in a second subscription communication mode, sending at least one fake NACK message from the user equipment to the node, wherein said sending at least one fake NACK message from the user equipment to the node in response to a communication from the node after the certain time period and prior to the tune away period occurs if the determined scheduling rate is lower than a threshold; and
   after the tune away period ends, receiving communications at the user equipment from the node and responding with an ACK message.

2. The method of claim 1, wherein the received communications received after the tune away period that are retransmissions from the node are not decoded by the user equipment when received as retransmissions.

3. The method of claim 1, further comprising determining the certain time period prior to the user equipment entering into the tune away period.

4. The method of claim 1, wherein the first subscription communication mode is Long Term Evolution (LTE) and the second subscription mode is Global System for Mobile Communications (GSMU).

5. The method of claim 1, wherein the threshold is 50%.

6. The method of claim 1, wherein the determination of the scheduling rate is made 100 ms prior to the tuning away period.

7. A wireless communication device, the device comprising:
   at least one radio frequency (RF) resource; and
   a processor coupled to the at least one RF resource, configured to connect to a first Subscriber Identity Module (SIM) associated with a first subscription and to a second SIM associated with a second subscription, and configured with processor-executable instructions to:
   receive communications from a node during a first communication mode associated with the first subscription;
   determine a scheduling rate for communications between the user equipment and the node;
   send at least one fake NACK message to the node in response to communications from the node received after a certain time period prior to a tune away period for a second communication mode associated with the second subscription, wherein said sending at least one fake NACK message from the user equipment to the node in response to a communication from the node after the certain time period and prior to the tune away period occurs if the determined scheduling rate is lower than a threshold; and
   receive communications from the node after the tune away period and respond with an ACK message.

8. The device of claim 7, wherein the threshold is 50%.

9. The device of claim 7, wherein the determination of the scheduling rate is made 100 ms prior to the tuning away period.

10. A communication system in which a first device is configured to selectively operate in a first subscription mode and a second subscription mode, the communication system comprising:
    a single-mode communication node configured to communicate in a first subscription mode; and
    a dual-mode communication device configured to receive communications from the single-mode communication node while in the first subscription mode, wherein the dual-mode communication device is configured to:

determine a scheduling rate for communications with the single-mode communication node;

send at least one fake NACK message to the single-mode communication node in response to a communication received in a time period preceding a tune away period in which the dual-mode communication device operates in a second subscription mode, wherein said sending at least one fake NACK message to the single-mode communication node occurs if the determined scheduling rate is lower than a threshold; and respond to a communication received from the single-mode communication node after the tune-away period ends with an ACK message.

11. The communication system of claim 10, wherein the dual-mode communication device decodes the communication received from the single-mode communication node in the time period immediately preceding the tune away period.

12. The communication system of claim 11, wherein the dual-mode communication device does not decode the communication received from the single-mode communication node after the tune-away period ends where the communication is a retransmission of communication made in the time period immediately preceding the tune away period.

13. The communication system of claim 10, wherein the time period immediately preceding the tune away period is 6 ms.

14. The communication system of claim 10, wherein the determination of the scheduling rate is made 100 ms prior to the tuning away period.

* * * * *